(12) United States Patent
Bansal et al.

(10) Patent No.: US 12,367,123 B2
(45) Date of Patent: Jul. 22, 2025

(54) METHOD AND SYSTEM TO DELAY A RESPONSE ASSOCIATED WITH A BUS TRANSACTION THAT IS TRANSMITTED TO A BUS MASTER TO PERFORM FAULT TESTING

(71) Applicant: NXP B.V., Eindhoven (NL)

(72) Inventors: Mukesh Bansal, Noida (IN); Prabhjot Singh, Noida (IN); Sudip Jain, Noida (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/424,977

(22) Filed: Jan. 29, 2024

(65) Prior Publication Data
US 2025/0190319 A1    Jun. 12, 2025

(30) Foreign Application Priority Data

Dec. 6, 2023   (IN) .............................. 202341083071

(51) Int. Cl.
*G06F 11/26* (2006.01)
*G06F 11/22* (2006.01)

(52) U.S. Cl.
CPC ............ *G06F 11/26* (2013.01); *G06F 11/221* (2013.01)

(58) Field of Classification Search
CPC ............................... G06F 11/26; G06F 11/221
See application file for complete search history.

(56) References Cited

U.S. PATENT DOCUMENTS

| | | | | |
|---|---|---|---|---|
| 5,574,692 A | * | 11/1996 | Dierke | G11C 29/56 365/201 |
| 5,819,053 A | * | 10/1998 | Goodrum | G06F 11/349 710/33 |
| 5,838,899 A | * | 11/1998 | Leavitt | G06F 11/1625 714/6.24 |
| 5,951,661 A | * | 9/1999 | Tavallaei | G06F 11/221 714/39 |
| 6,032,271 A | * | 2/2000 | Goodrum | G06F 11/2005 714/E11.201 |

(Continued)

FOREIGN PATENT DOCUMENTS

CN     114185824 A     3/2022

OTHER PUBLICATIONS

Gupta et al., "NTRP: Novel Approach for DUT Testing based on Nonintrusive Timing Randomization Probes using SystemC Verification Library," 2016 International Conference on Information Technology (InCITe)—The Next Generation IT Summit on the Theme—Internet of Things: Connect your Worlds, Oct. 6-7, 2016, 6 pages.

(Continued)

*Primary Examiner* — Matthew M Kim
*Assistant Examiner* — Indranil Chowdhury (57) ABSTRACT

A bus response to a bus request transmitted by a bus master over a network circuit is received by a bus response modifier. The bus response is transmitted by a bus slave and the bus request and the bus response are associated with a bus transaction over the network circuit. The bus response modifier selects a delay time to delay the bus response to fault test a system and the bus response is delayed by the delay time. A determination is made whether the fault test fails based on the delayed bus response.

20 Claims, 3 Drawing Sheets

(56) References Cited

U.S. PATENT DOCUMENTS

| | | | | |
|---|---|---|---|---|
| 6,073,194 | A * | 6/2000 | Lowe | G06F 13/4027 |
| | | | | 716/108 |
| 8,291,244 | B2 * | 10/2012 | Tune | G06F 1/3203 |
| | | | | 713/320 |
| 10,042,692 | B1 | 8/2018 | Azad et al. | |
| 2002/0035658 | A1 * | 3/2002 | Whetsel | G06F 11/0745 |
| | | | | 714/E11.173 |
| 2004/0088604 | A1 * | 5/2004 | Bland | G06F 11/221 |
| | | | | 714/E11.161 |
| 2009/0268878 | A1 * | 10/2009 | Walters | H04M 3/305 |
| | | | | 379/27.01 |

OTHER PUBLICATIONS

Arm, "AMBA AXI Protocol v1.0, Specification," XP-002342105, http://www.arm.com/products/solutions/axi_spec.html, Jun. 15, 2003 first release, Mar. 19, 2004 update, 108 pages.

* cited by examiner

METHOD AND SYSTEM TO DELAY A RESPONSE ASSOCIATED WITH A BUS TRANSACTION THAT IS TRANSMITTED TO A BUS MASTER TO PERFORM FAULT TESTING

CROSS-REFERENCE TO RELATED APPLICATIONS

This application claims the priority under 35 U.S.C. § 119 of India patent application No. 202341083071, filed on 6 Dec. 2023, the contents of which are incorporated by reference herein.

FIELD OF USE

This disclosure generally relates to fault testing, and in particular, a method and system to delay a response associated with a bus transaction that is transmitted to a bus master to perform fault testing in a system.

BACKGROUND

A system on a chip (SoC) includes a plurality of bus masters which communicate with a plurality of bus slaves over a network circuit using an on-chip bus protocol such as Advanced Extensible Interface (AXI). The bus master could be a direct memory access (DMA) circuit and the bus slave could be a memory controller. The DMA circuit performs a bus transaction such as a read or write transaction. To perform the read transaction, the bus master issues a read request over a respective channel(s) of the AXI bus followed by the bus slave issuing a read response to the read request with data read. To perform the write transaction, the bus master issues a write request with write data to be written over a respective channel(s) of the AXI bus followed by the bus slave issuing a write response to the write request that indicates that the write data was written over a respective channel. The response defined by AXI typically includes a signal such as an xVALID signal to indicate a payload on the channel is valid and an xREADY signal to indicate a receiving entity is ready to receive additional data, respectively. The time for the bus master to receive the response associated with the bus transaction varies and could exceed a predefined time due to processing delays or system errors. A timeout checker of the SoC determines this condition and issues a fault indication to a fault processing circuit to perform fault processing associated with the response not being received within the predefined time. The fault processing avoids the bus master entering into a hang state.

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to a method and apparatus for delaying a response of a bus transaction that is transmitted from a bus slave to a bus master to perform fault testing. A bus response modifier is arranged between the bus master and the bus slave in a system such as a system-on-a-chip (SoC). In one example, the bus response modifier delays a response to a write or read request transmitted by a bus slave so that the bus master receives the response at a delayed time. In another example, the bus response modifier masks a response to a write or read request transmitted by a bus slave so that the bus master does not receive the response at all. The system also includes a timeout checker which determines that the response to the request will not be received by the bus master in a predefined time because of the delay and issues a fault to a fault processing system. By varying the delay, the system is able to be fault tested. The bus response modifier also enables assessing performance of the system in presence of the response being delayed and detecting error conditions in the system. Well known instructions, protocols, structures, and techniques have not been shown in detail in order not to obfuscate the description.

Figure 1:
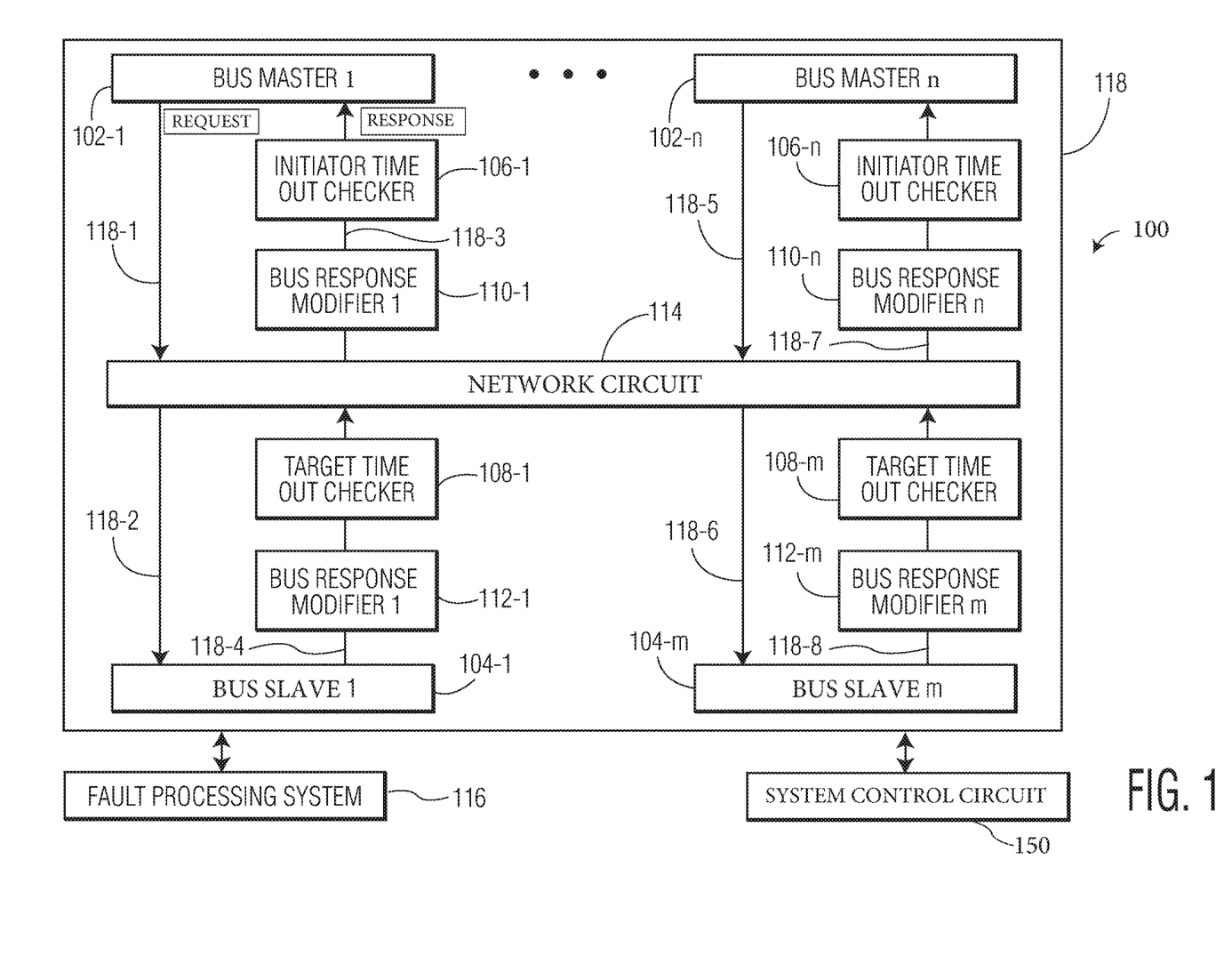
FIG. 1 illustrates a system to delay a response of a bus transaction that is transmitted from a bus slave to a bus master to perform fault testing in accordance with an embodiment.

FIG. 1 illustrates an example system 100 to delay a response of a bus transaction that is transmitted from a bus slave to a bus master to perform fault testing in accordance with an embodiment. The system 100 may be embedded in an electronic system (not shown) such as an automotive system or an aircraft guidance system, a ship system, among other types of systems where fault testing is important to safe operation. The system 100 may include an integrated circuit such as a system-on-a-chip (SoC) 118 having a plurality of bus masters 102, a network circuit 114, and a plurality of bus slaves 104. Bus masters 102-1 to 102-$n$ and bus slaves 104-1 to 104-$m$ are shown where n and m are integers greater than zero and either "m" is equal to "n" or "m" is not equal to "n" in an example. Further, reference to a component such as the bus master 102 or bus slave 104 and any other components disclosed herein without the suffix "n" or "m" may refer to a single instance of the component or a plurality of the component depending on the context. To illustrate, bus master 102 may refer to a single bus master of the plurality of bus masters while bus masters 102 may refer to a plurality of bus masters. The network circuit 114 may provide an arbitration, routing, or switching of communication between the bus master 102 and bus slave 104. For example, bus master 102-1 may communicate with bus slave 104-1 and bus master 102-2 may communicate with bus slave 102-2. Alternatively, bus master 102-1 may communicate with bus slave 104-1 and bus slave 104-2. Still alternatively, bus slave 104-1 may communicate with bus master 102-1 and bus master 102-2. Other variations are also possible. In an example, the bus master 102 may be a processing core or hardware such as a direct memory access (DMA) circuit and the bus slave 104 could be a controller such as a memory controller to a memory system such as double data rate (DDR) memory. In another example, the bus master 102 may be a processor core such as a controller and the bus slave 104 may be a peripheral communication interface (PCI) or universal serial bus (USB) interface. In an example, the system 100 may be located in an automobile and the bus master 102 and bus slave 104 may facilitate performing functions of the automobile such as an ignition, anti-lock braking, or steering. In an example, the system 100 and components thereof described herein may be implemented by one or more of analog circuitry, mix signal circuitry, memory circuitry, logic circuitry, and processing circuitry that executes code that when executed by the processing circuitry performs the disclosed functions, among other implementations.

The bus master 102 and bus slave 104 may perform a bus transaction such as a read transaction or a write transaction. The bus transaction may include the bus master 102 (initiator) such as bus master 102-1 issuing a request to the bus slave 104 (target) such as bus slave 104-1 and the bus slave 104 issuing to the bus master 102 a response to the request via the network circuit 114. In an example, the bus master 102 and the bus slave 104 may access the network circuit 114 via a respective network interface unit (NIU) (not shown) and the NIUs and network circuit 114 may define an interconnect fabric. In an example, bus master 102-1 and the bus slave 104-1 may perform a scatter gather operation where data is accessed from a plurality of locations in a memory (not shown) coupled to the bus slave 104-1. To perform the read transaction, the bus master 102-1 issues over the network circuit 114 a read request of data to be read from a memory to the bus slave 104. In an example, the network circuit 114 may be configured to send the request from the bus master 102-1 to the bus slave 104-1 based on signalling provided to the NIU. The signalling for communication to the bus slave 104-1 may originate from the bus slave 104-1 and be in accordance with an on-chip bus protocol such as Advanced Extensible Interface (AXI). The bus slave 104-1 may receive the request and issue a read response to the bus master 102-1 over the network circuit 114 of data to be read. In an example, the network circuit 114 may be configured to send the request from the bus slave 104-1 to the bus master 102-1 based on a signalling provided to the NIU. The signalling for communication to the bus slave 104-1 may originate from the bus master 102-1 and be in accordance with the on-chip bus protocol such as AXI. A write operation is performed in a similar manner. The bus master 102-1 issues over the network circuit a write request and data to be written followed by the bus slave 104-1 issuing a write response which indicates that write data is written. When bus master 102 and bus slave 104 implement an on-chip bus protocol such as AXI, the response may include an xVALID signal or an xREADY signal to indicate a payload on the channel is valid or the receiving entity is ready to receive additional data, respectively.

In an example, the system 100 may also include a timeout checker. In an example, the timeout checker may be arranged between the bus slave 104 and the network circuit 114 and referred to as a target timeout checker 108 or arranged between the bus master and the network circuit 114 and referred to as an initiator timeout checker 106. In an example, the timeout checker and bus response modifier may be arranged in an NIU. The timeout checker may receive the response and provide the response downstream to the bus master 102 or network circuit 114 depending on the arrangement. The timeout checker may have a timer which is a free running counter. A counter value of the timer may either increment or decrement over time in accordance with a system clock signal such as a rising or falling edge of the clock signal. The timer may be used to determine a time between when a bus master 102 transmits a request and the timeout checker receives a response to the request. In an example, a system control circuit 150 which controls operation of the system 100 may cause the timeout checker to instantiate the timer when the bus master 102 transmits the request and record the count value of the timer when the bus master 102 transmits the request associated with the transaction. The timeout checker may also periodically monitor the counter value of the timer until the response is received by the timeout checker. A difference indicative of a delay in receiving the response compared to when it was sent by the bus master 102 may be calculated between the monitored count value and the recorded counter value when the bus master 102 transmits the request. If the delay does not exceeds a boundary time delay, then the timeout checker may deallocate the timer since the response was received with a delay less than the boundary time delay. The boundary time delay may be a predefined time delay. If the delay exceeds a boundary time delay of the timeout checker before the response is received, then the timeout checker signals a fault processing system 116 to perform fault processing. In an example, the signal may cause a software reset in the system 100. The software reset may terminate software executing on the system 100 and clear any data in memory. In another example, the signal may cause a hardware reset in the system 100. The hardware reset may clear the software and all configuration parameters and boot the system 100 to reload the software and configuration parameters. Other reactions are also possible such as sending an interrupt signal to a component of the system 100 to cause the component to attempt to rectify a fault without performing a reset.

In an example, a respective boundary time delay for each of the initiator timeout checker 106 and target timeout checker 108 may be arranged such that if the delay in receiving the response by the target timeout checker 108 exceeds a respective boundary time delay, then the delay in receiving the response by the initiator timeout checker 106 may also exceed a respective boundary time delay resulting in respective fault signals to the fault processing system 116. In an example, a respective boundary time delay for each of the initiator timeout checker 106 and target timeout checker 108 may be arranged such that if the delay in receiving the response by the initiator timeout checker 106 exceeds a respective boundary time delay, then the delay in receiving the response by the target timeout checker 106 might not exceed a respective boundary time delay. The initiator timeout checker 106 may send a fault signal to the fault processing system 116 but the target timeout checker 108 might not send a fault signal to the fault processing system 116. The fault signal may be an interrupt to the fault processing system 116 in an example.

Embodiments disclosed herein are directed to a method and apparatus for delaying a response of a bus transaction that is transmitted from a bus slave to a bus master when the bus master sends a request associated with the transaction to perform fault testing in the system 100. The disclosed method and apparatus allows for verifying operation of the timeout checker for fault processing, detecting hardware or software bugs in the system 100, and evaluating performance of the system 100 in the presence of a delay in the response, among other examples. The system 100 includes one or more bus response modifiers. The bus response modifier may be located between the network circuit 114 and the bus slave 104 and identified as bus response modifier 112-1 to 112-m or located between the bus master 106 and the network circuit 114 and identified as bus response modifier 110-1 to 110-n. In an example, a bus response modifier may monitor a respective channel. For example, bus response modifier 112-1 may monitor channel 118-4, bus response modifier 110-1 may monitor channel 118-3, bus response modifier 112-*m* may monitor channel 118-8, and bus response modifier 110-*n* may monitor channel 118-7. The channel may be a read channel for carrying a read response or a write channel for carrying a write response. For example, the bus master 102-1 may send a request associated with a bus transaction. Further, the bus response modifier 112-1 may receive a response to the bus transaction from the bus slave 104-1 and delay when the response is transmitted to the network circuit 114. In another example, the bus master 102-1 may send a request associated with a bus transaction and the bus response modifier 110-1 may receive a response to a transaction from the network circuit 114 and delay when the response is transmitted to the bus master 102-1. The bus response modifier 110 may control a time when a response from any bus slave 104 is received by a specific bus master 102 while the bus response modifier 112 may control a time when a response from a bus slave 104 is received by any of the bus masters 102. For example, bus response modifier 110-1 may control a time when a response is received by the bus master 102-1 from any of the bus slave 104-1 to bus slave 104-*m*. As another example, bus response modifier 112-1 may control a time when a response is received by any of the bus master 102-1 to 102-*n* from the bus slave 104-1. The bus response modifier 112 may receive a response from the bus slave 104 or network circuit 114 and delay receipt of the response by the bus master 102. For example, an amount a respective response is delayed may vary and be swept over a range of time from a minimum time to a maximum time. As another example, the amount of delay may be indefinite which results in the bus response not being output by the bus response modifier. The response is effectively masked to the bus master 102. A hang state may be unknown state of the system 100 resulting from the bus master 102 waiting for the response beyond an expected period of time. If the system 100 enters the hang state, then the system operation may be unreliable and could affect safety of the system 100. In an example, the delay which causes the system 100 to enter the hang state may be determined based on sweeping the time when the response is received by a bus master 102 from a minimum delay time to a maximum delay time and the boundary time delay of the timeout checker may be modified to cause the fault signal to be provided to the fault processing system 116 before the system 100 enters the hang state. In another example, the delay which causes the system 100 to enter the hang state may be used to determine that the system 100 has a hardware or software error in the system 100 and to correct the error. Further, data throughput in the system 100 may be evaluated for different amount of delay introduced by a bus response modifier to define a corresponding boundary time delay for a bus response master to meet performance objectives.

Figure 2:
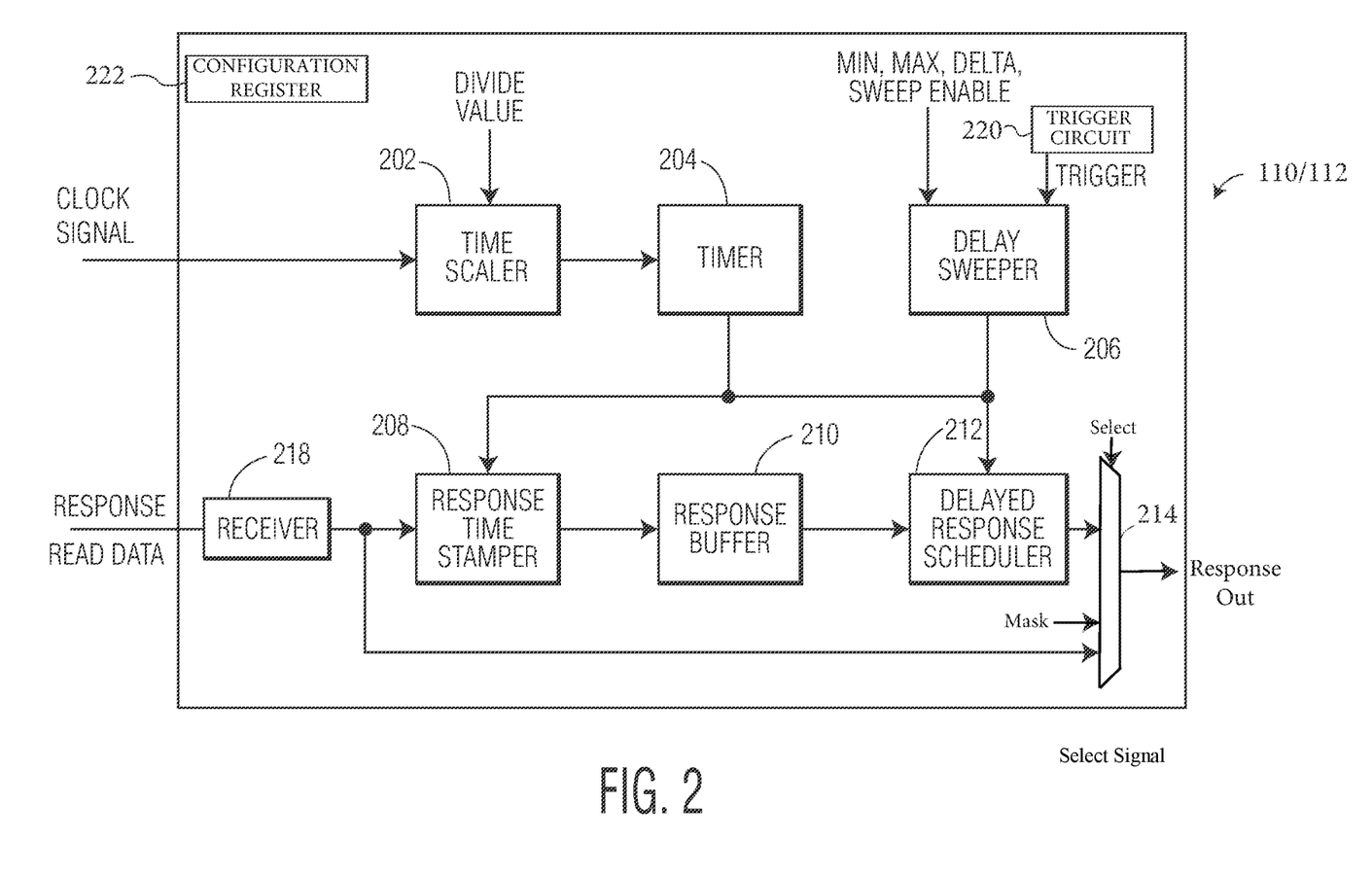
FIG. 2 illustrates a block diagram of a bus response modifier of the system in accordance with an embodiment.

FIG. 2 illustrates a block diagram of a bus response modifier of the system 100 in accordance with an embodiment. The bus response modifier 112 may be one of bus response modifier 110-1 to 110-*n* or bus response modifier 112-1 to 112-*m*. The bus response modifier may receive a clock signal from a system clock (not shown) of the system 100 and input from a respective channel 118 which could include the read or write response and/or read data associated with a read response in an example. The bus response modifier may output to the timeout checker the response or read data with a corresponding delay, no delay, or not output the response in which case the response and data is masked. The bus response modifier may include a time scaler 202 coupled to a timer 204. Further, the bus response modifier may include a receiver 218 coupled to a response time stamper 208, the response time stamper 208 coupled to a response buffer 210, and the response buffer 210 coupled to a delayed response scheduler 212. The timer 204 may be further coupled to the response time stamper 208 and the delayed response scheduler 212. A delay sweeper 206 may be coupled to the delayed response scheduler 212 and the delayed response scheduler 212 may be coupled to a multiplexer 214.

In an example, the time scaler 202 may receive the clock signal and a divide value. The divide value may be an integer or real number used to adjust a frequency of the clock signal and the divided clock signal is provided to the timer 204. The timer 204 may be a free running counter with a counter value which increments or decrements based on a rising or falling edge of the divided clock signal in an example. The counter value may change as a function of time and the divide value may control the rate of change. The timer 204 may provide the counter value in real time to one or more of the response timer stamper 208 and the delayed response scheduler 212.

The receiver 218 may receive and provide the response to the response time stamper 208. The response may be received directly from the bus slave 104 or the network circuit 114 depending on an arrangement of the bus response modifier 110 in the system 100. The response time stamper 208 may capture the counter value of the counter of the timer 204 when the response is received which is then associated with the incoming response as a timestamp. The response buffer 210 may store the response along with timestamp for both the read and write response as well as the read data.

The delay sweeper 206 may indicate a delay which is to be applied to a respective response in the response buffer 210 before the respective response is transmitted by the bus response modifier. The delay sweeper 206 may have one or more settings including a minimum delay time, a maximum delay time, a delta value, and a sweep enable signal. The minimum delay time may define a minimum delay of the received response before being transmitted by the bus response modifier, the maximum delay time may define a maximum delay of the received response before being transmitted by the bus response modifier. Further, if a sweep enable is set (e.g., sweep_en=1) the delay may be adjusted over time from the minimum delay time to the maximum delay time at increments of a delta value for a respective response while if the sweep enable is not set (e.g., sweep_en=0), then the delay may not be swept and instead fixed at a delay value such as the minimum or maximum delay time or delay time in between. In an example, the minimum delay time, maximum delay time and delta value increment may each be in terms of a particular number of increments of the counter value where the delta value increment<minimum delay time<maximum delay time. During the sweep, the delay before the delay response scheduler 212 outputs a response may start at the minimum delay time and for each subsequent group of responses that is received the delay is increased by the delta increment value until the maximum delay time is reached. The group may be one or more responses stored in the response buffer 210 and a trigger signal from a trigger circuit 220 of the bus response modifier may indicate whether the delay is to be changed (e.g., incremented or decremented) within the minimum and maximum delay time. The trigger circuit 220 may determine a timing of when the trigger signal is provided and in an example the trigger signal may be provided each time a group of responses is stored in the response buffer 210. In an example, the time when the response is transmitted may be determined as the counter value reaching "timestamp value+current delay." The current delay may be the delay time for a group of responses in the response buffer 210 to be transmitted where the current delay may be updated based on a receipt of a trigger signal and equal to: "current delay=minimum delay+delta value increment+previous delay," where previous delay is a delay time of a last group of responses which were delayed during the sweep and remaining parameters are defined above. The delta value increment may be a fixed increment or variable increment in an example. To illustrate, the counter value may be 1000 and the minimum delay may be 10 and maximum delay may be 100 with a delta value increment of 10. In this example, the delay will be swept as 1000, 1010, 1020 . . . to 1100 for each group of responses based on respective trigger signals. The delayed response scheduler 212 may transmit a respective group of responses with a delay to sweep delay of responses from the minimum delay time to the maximum delay time at increments of the delta value for different groups of responses over time.

The multiplexer 214 may receive the delayed response from the delayed response scheduler 212. Further, the multiplexer 214 may receive the response which is input to the bus response modifier. The multiplexer 214 may be configured to select whether the delayed response is further transmitted by the bus response modifier, the response without any delay, or no response is output to mask the response and data from the bus master. The output may be based on a select signal provided to the multiplexer 214. In an example, the signal may indicate the response input is transmitted without any delay (e.g., the signal indicates bits "00"), the signal may indicates the delayed response is transmitted (e.g., the signal indicates bits "01"), or the signal may indicates the response is masked, i.e., no response is transmitted (e.g., the signal indicates bits "10"). In an example, the timer may be active when the signal indicates bits "01".

In an example, the bus response modifier may have a configuration register 222 to configure operation of the bus response modifier. The configuration register 222 may have one or more bits that indicate the configuration. The bit may be written to the configuration register 222 by the system control circuit 150 in an example during a configuration of the system 100. The configuration register 222 may indicate one or more of the divide value and delay settings (minimum value, maximum value, delta value, and sweep enable values) used by the bus response modifier during operation. Further, the configuration register 222 may indicate the select signal to be input to the multiplexer 214 used by the bus response modifier during operation and the timing of the trigger signal output by the trigger circuit 220. The bits of the configuration register 222 may be sticky bits in an example which are only able to be modified by the system control circuit 150 to prevent other components in the system 100 from changing operation of the bus response modifier from the configuration set by the system control circuit 150. One or more of a response buffer depth which indicates a size of the response buffer indicative of a number of responses sent with a particular delay and a timer width of timer 204, respectively, may also be configurable by the system control circuit 150. Further, the bus response modifier may be coupled to one of a read channel and write channel of the interconnect 114 and configurable to select whether responses of the read channel or write channel are to be delayed.

Figure 3:
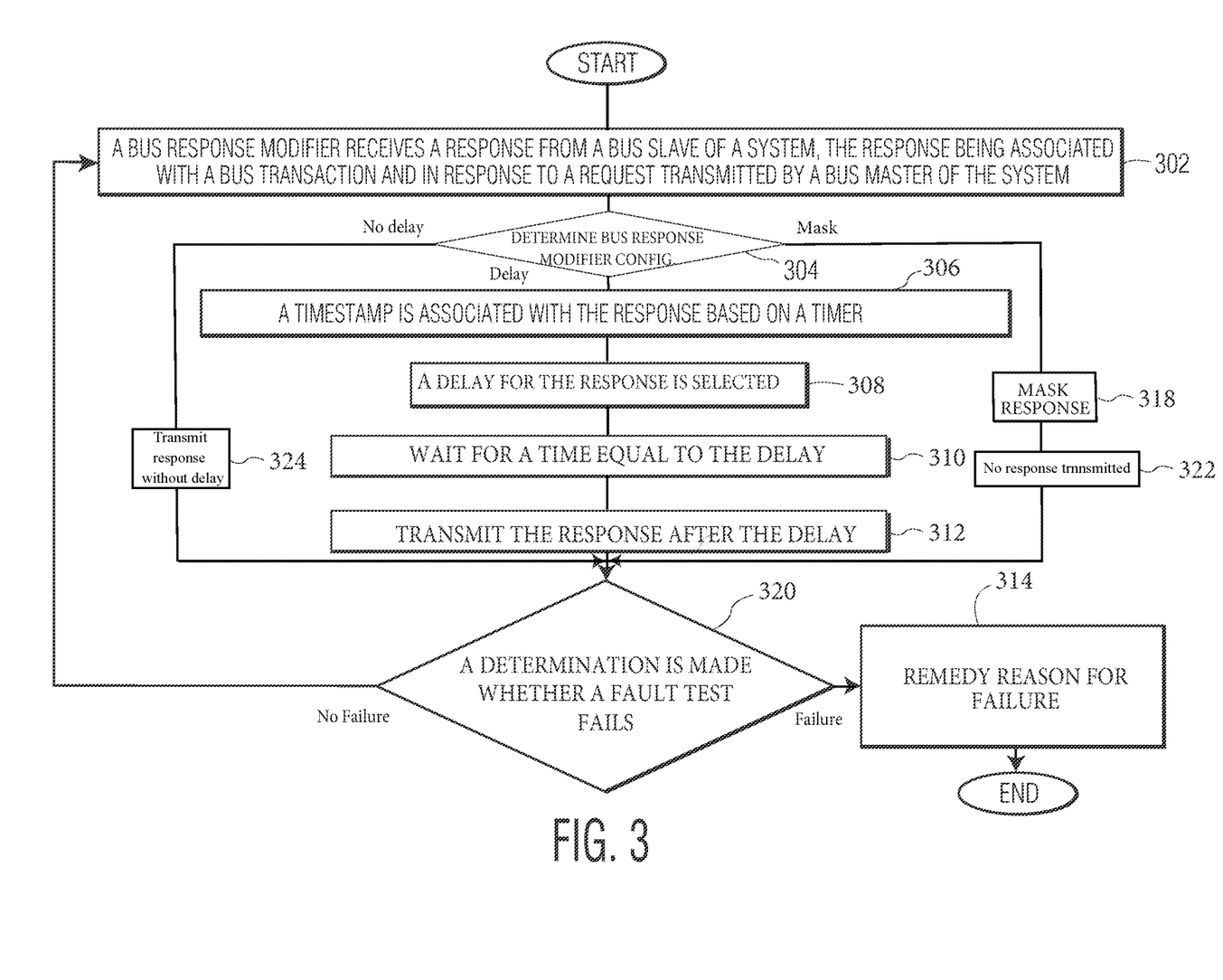
FIG. 3 is a flow chart of functions associated with delaying the response in accordance with an embodiment.

FIG. 3 is a flow chart 300 of functions associated with delaying the response in accordance with an embodiment. The functions may be performed by the bus response modifier and based on analysis of the operation of the system 100 in an example during a testing process to validate operation of the system 100 in silicon and/or during field operation of the system 100.

At 302, a bus response modifier receives a response from a bus slave of a system, the response being associated with a bus transaction and in response to a request transmitted by a bus master of the system. In an example, the response may be received from the bus slave directly or via the interconnect fabric (e.g., including the network circuit 114 and NIU) which is between the bus master and bus slave. At 304, a configuration of the bus response modifier is determined. The configuration which is based on the configuration register 222 may indicate whether the received response is to be delayed, masked, or not delayed to perform fault testing. If the response is masked, the processing continues to 318 where the response is masked based on the selection signal to the multiplexer 214 and no response is transmitted at 322. If the response is not delayed based on the selection signal to the multiplexer 214, the processing continues to step 324 where the response is transmitted without delay. If the response is delayed, then processing continues to steps 306-312. At 306, a timestamp is associated with the response based on a timer. In an example, the timer is a counter of the bus response modifier and the timestamp may be defined by a counter value of the timer. At 308, a delay for the response is selected. In an example, the delay may be a delay time between a minimum delay time and a maximum delay time where the delay may be incremented over time from the minimum delay time to the maximum delay time by assertion of the trigger signal by the trigger circuit 220 as additional responses are received. At 310, the bus response modifier waits for a time equal to the delay. In an example, the time equal to the delay may be indicated by a difference between a counter value of the timer and the timestamp associated with the response being a certain value. At 312, the response is transmitted after the delay based on the select signal to the multiplexer 214. The bus master may receive the response without delay based on step 324, receive the response with a delay based on step 312, and might not receive the response based on step 318. At 320, a determination is made whether a fault test fails based on masking the response, not delaying the response, or delaying the response. The fault test may fail if no fault signal is issued to the fault processing system because the bus master receives the response with a delay or does not receive the response and the system enters into a hang state. The fault test may not fail if a fault signal is issued to the fault processing system because the bus master receives the response with a delay or does not receive the response and the system does not enter into the hang state. If the fault test fails, then the reason for the failure may be determined and remedied at 314. For example, a boundary time delay of the timeout checker may be adjusted or an error in hardware or software is corrected while if the fault test does not fail, processing continues to 302 where another response is received.

Programming a delay of the bus response modifier allows for performing fault testing in the system 100. A bus response modifier may delay the response that is received for a delay time before transmitting to confirm that the target timeout checker issues the fault signal to the fault processing system 116 when the delay exceeds a boundary time delay. Further, the fault testing may involve a bus response modifier delaying to transmit the response for a delay time which results in the system 100 entering the hang state. This amount of the delay time which causes the system 100 to enter into the hang state may be used to program the boundary time delay of the timeout checker so that if the response is delayed by less than this amount, the timeout checker signals the fault to the fault system rather than allowing the system to enter the hang state. Further, the fault testing may include testing the timeout checker by programming the bus response modifier to delay the response to longer than the boundary time delay of the timeout checker and confirming the timeout checker signals a fault or detecting any other errors in the system 100. Further, the bus response modifier may be used to monitor data throughput of the system 100 for varying delays of the response to determine whether the data throughput of the system 100 in presence of a certain delay meets expected criteria. Further, the boundary delay time may be decreased to increase throughput in an example. The bus response modifier may also mask or delay transmission of a response for one or all responses in the system 100 to determine whether a fault signal is issued to fault test the operation of the hardware of the system 100 and any software associated with the system 100.

In an embodiment, a method for fault testing a system is disclosed. The method comprises: receiving a bus response to a bus request transmitted by a bus master over a network circuit, wherein the bus response is transmitted by a bus slave and the bus request and the bus response are associated with a bus transaction over the network circuit; selecting a delay time to delay transmission of the bus response to fault test the system, the system comprising the bus master, the bus slave, and the network circuit; delaying the bus response by the delay time; transmitting the delayed bus response to the bus master; and determining whether the fault test fails based on the delayed bus response. In an example, the bus response is delayed by the delay time after the bus slave transmits the bus response and before the bus response is provided to the network circuit. In an example, the bus response is delayed by the delay time after the network circuit outputs the bus response and before the bus response is received by the bus master. In an example, the method further comprises receiving another bus response and masking the other bus response from transmission. In an example, the method further comprises receiving additional bus responses and varying a respective delay time of each of the additional bus responses between a minimum delay time and a maximum delay time. In an example, the respective delay of one or more second responses of the additional responses is increased compared to one or more first responses of the additional responses. In an example, delaying the bus response comprises delaying the bus response based on an indication of one or more bits in a configuration register. In an example, the fault test fails, the method further comprising modifying a boundary time delay of a timeout checker to be less than the delay time, wherein the timeout checker signals a fault when the response to the request is delayed by at least the delay time. In an example, the method further comprises determining a data throughput of the system when the fault test does not fail and decreasing the boundary time delay to increase the data throughput of the system.

In another embodiment, a bus response modifier is disclosed. The bus response modifier comprises: a receiver arranged to receive a bus response to a bus request transmitted by a bus master over a network circuit, wherein the bus response is transmitted by a bus slave and the bus request and the bus response are associated with a bus transaction over the network circuit; a delay sweeper arranged to select a delay time to delay transmission of the bus response to perform a fault test; a delayed response scheduler arranged to delay the bus response by the delay time; and a multiplexer arranged to transmit based on a select signal the delayed bus response to the bus master. In an example, the bus transaction is one of a read operation and a write operation. In an example, the receiver is further arranged to receive another bus response and the multiplexer is further arranged to not transmit the other bus response to mask the other bus response. In an example, the receiver is further arranged to receive additional bus responses, the delayed response scheduler is further arranged to delay the additional bus responses, and the multiplexer is further arranged to transmit the delayed additional bus responses, wherein respective delays of the additional bus responses range from a minimum delay time to a maximum delay time. In an example, the delay of second one or more responses of the additional responses are increased compared to first one or more responses of the additional responses. In an example, the bus response modifier further comprises a configuration register, wherein the bus response modifier is further configured to delay the bus response based on an indication of one or more bits in the configuration register. In an example, selecting the delay time comprises selecting the time to cause the fault test to fail.

In yet another embodiment, a system is disclosed. The system comprises: a bus master; a bus slave; a network circuit; wherein the bus master is arranged to communicate with the bus slave over a channel via the network circuit; a bus response modifier comprising: a receiver arranged to receive a bus response to a bus request transmitted by the bus master over the network circuit, wherein the bus response is transmitted by the bus slave and the bus request and the bus response are associated with a bus transaction over the network circuit; a delay sweeper arranged to select a delay time to delay transmission of the bus response; a delayed response scheduler arranged to delay transmission of the bus response by the delay time; and a multiplexer arranged to transmit based on a selection signal the delayed bus response to the bus master, wherein the delayed bus response which is transmitted facilitates fault testing of the system. In an example, the system further comprises a timeout checker arranged to signal a fault when the response to the request is delayed by a boundary time delay. In an example, the system further comprises the timeout checker arranged to modify the boundary time delay with the delay time based on the system being in a hang state. In an example, the bus response modifier is arranged between one of (i) the bus master and the network circuit and (ii) the bus slave and the network circuit.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

We claim:

1. A method for fault testing a system, the method comprising:
    receiving a bus response to a bus request transmitted by a bus master over a network circuit, wherein the bus response is transmitted by a bus slave and the bus request and the bus response are associated with a bus transaction over the network circuit;
    selecting a delay time to delay transmission of the bus response to fault test the system, the system comprising the bus master, the bus slave, and the network circuit;
    delaying the bus response by the delay time;
    transmitting the delayed bus response to the bus master; and
    determining whether the fault test fails based on the delayed bus response.

2. The method of claim 1, wherein the bus response is delayed by the delay time after the bus slave transmits the bus response and before the bus response is provided to the network circuit.

3. The method of claim 1, wherein the bus response is delayed by the delay time after the network circuit outputs the bus response and before the bus response is received by the bus master.

4. The method of claim 1, further comprising receiving another bus response and masking the other bus response from transmission.

5. The method of claim 1, further comprising receiving additional bus responses and varying a respective delay time of each of the additional bus responses between a minimum delay time and a maximum delay time.

6. The method of claim 5, wherein the respective delay of one or more second responses of the additional bus responses is increased compared to one or more first responses of the additional bus responses.

7. The method of claim 1, wherein delaying the bus response comprises delaying the bus response based on an indication of one or more bits in a configuration register.

8. The method of claim 1, wherein the fault test fails, the method further comprising modifying a boundary time delay of a timeout checker to be less than the delay time, wherein the timeout checker signals a fault when the bus response to the bus request is delayed by at least the delay time.

9. The method of claim 1, further comprising determining a data throughput of the system when the fault test does not fail and decreasing a boundary time delay to increase the data throughput of the system.

10. A bus response modifier comprising:
    a receiver arranged to receive a bus response to a bus request transmitted by a bus master over a network circuit, wherein the bus response is transmitted by a bus slave and the bus request and the bus response are associated with a bus transaction over the network circuit;
    a delay sweeper arranged to select a delay time to delay transmission of the bus response to perform a fault test;
    a delayed response scheduler arranged to delay the bus response by the delay time; and
    a multiplexer arranged to transmit based on a select signal the delayed bus response to the bus master.

11. The bus response modifier of claim 10, wherein the bus transaction is one of a read operation and a write operation.

12. The bus response modifier of claim 10, wherein the receiver is further arranged to receive another bus response and the multiplexer is further arranged to not transmit the other bus response to mask the other bus response.

13. The bus response modifier of claim 10, wherein the receiver is further arranged to receive additional bus responses, the delayed response scheduler is further arranged to delay the additional bus responses, and the multiplexer is further arranged to transmit the delayed additional bus responses, wherein respective delays of the additional bus responses range from a minimum delay time to a maximum delay time.

14. The bus response modifier of claim 13, wherein the delay of second one or more responses of the additional bus responses are increased compared to first one or more responses of the additional bus responses.

15. The bus response modifier of claim 10, further comprising a configuration register, wherein the bus response modifier is further configured to delay the bus response based on an indication of one or more bits in the configuration register.

16. The bus response modifier of claim 10, wherein selecting the delay time comprises selecting the delay time to cause the fault test to fail.

17. A system comprising:
    a bus master;
    a bus slave;
    a network circuit;
    wherein the bus master is arranged to communicate with the bus slave over a channel via the network circuit;
    a bus response modifier comprising:
        a receiver arranged to receive a bus response to a bus request transmitted by the bus master over the network circuit, wherein the bus response is transmitted by the bus slave and the bus request and the bus response are associated with a bus transaction over the network circuit;
        a delay sweeper arranged to select a delay time to delay transmission of the bus response;

a delayed response scheduler arranged to delay transmission of the bus response by the delay time; and a multiplexer arranged to transmit based on a selection signal the delayed bus response to the bus master, wherein the delayed bus response which is transmitted facilitates fault testing of the system.

18. The system of claim 17, further comprising a timeout checker arranged to signal a fault when the bus response to the bus request is delayed by a boundary time delay.

19. The system of claim 18, further comprising the timeout checker arranged to modify the boundary time delay with the delay time based on the system being in a hang state.

20. The system of claim 17, wherein the bus response modifier is arranged between one of (i) the bus master and the network circuit and (ii) the bus slave and the network circuit.

\* \* \* \* \*